ical Patent

United States Patent [19]
Davidson

[11] Patent Number: 5,501,398
[45] Date of Patent: Mar. 26, 1996

[54] DEVICE FOR LIQUID AND SOLID DELIVERY FROM CROP SPRAYING AIRCRAFT

[75] Inventor: Maxwell W. Davidson, Edinburgh, Great Britain

[73] Assignees: Maxwell Davidson Ltd., Edinburgh, United Kingdom; Custom Farm Service of Arizona, Stanfield, Ariz.

[21] Appl. No.: 290,708

[22] PCT Filed: Feb. 12, 1993

[86] PCT No.: PCT/GB93/00302

§ 371 Date: Sep. 7, 1994

§ 102(e) Date: Sep. 7, 1994

[87] PCT Pub. No.: WO93/15954

PCT Pub. Date: Aug. 19, 1993

[30] Foreign Application Priority Data

Feb. 12, 1992 [GB] United Kingdom ............... 9202872

[51] Int. Cl.$^6$ .................................................. B64D 1/18
[52] U.S. Cl. ........................................ 239/171; 244/136
[58] Field of Search .................... 239/171; 244/1 TD, 244/136; 43/124, 900

[56] References Cited

U.S. PATENT DOCUMENTS

| 1,722,467 | 7/1929 | Huff . | |
|---|---|---|---|
| 1,749,504 | 3/1930 | Pelton | 239/171 X |
| 1,761,889 | 6/1930 | Junkers | 244/136 |
| 2,462,524 | 5/1947 | Burnam | 244/136 |
| 2,528,986 | 11/1950 | Adams | 239/171 X |
| 2,772,061 | 11/1956 | Sellers | 244/136 |
| 3,533,582 | 10/1970 | Roth | 244/136 |
| 3,994,437 | 11/1976 | Kitterman | 239/171 X |
| 4,260,108 | 4/1981 | Maedgen, Jr. | 239/171 |
| 5,148,989 | 9/1992 | Skinner | 239/171 |

FOREIGN PATENT DOCUMENTS

| 1183961 | 7/1959 | France . | |
| 2586167 | 2/1987 | France . | |
| 143660 | 10/1960 | U.S.S.R. | 239/171 |
| 0765091 | 1/1957 | United Kingdom . | |

Primary Examiner—Andres Kashnikow
Assistant Examiner—Lesley D. Morris
Attorney, Agent, or Firm—Kenyon & Kenyon

[57] ABSTRACT

An orifice discharge device is provided for use in crop spraying aircraft to provide a downward spray of treatment substance especially liquid for crop or ground treatment. The device comprises an air passage having an inlet portion with a bell mouth, and an outlet portion having an Outlet discharge extending laterally relative to the inlet portion of the air passage, an elbow portion being provided between the inlet portion and the outlet portion. Treatment substance is supplied by a supply conduit to the outlet portion for discharge via a discharge nozzle of the supply conduit. In use, the inlet portion receives a horizontal flow of air and a high velocity downwards discharge of air with treatment substance (liquid particles) occurs from the outlet discharge of the outlet portion of the air passage. The device is preferably of streamline form.

10 Claims, 3 Drawing Sheets

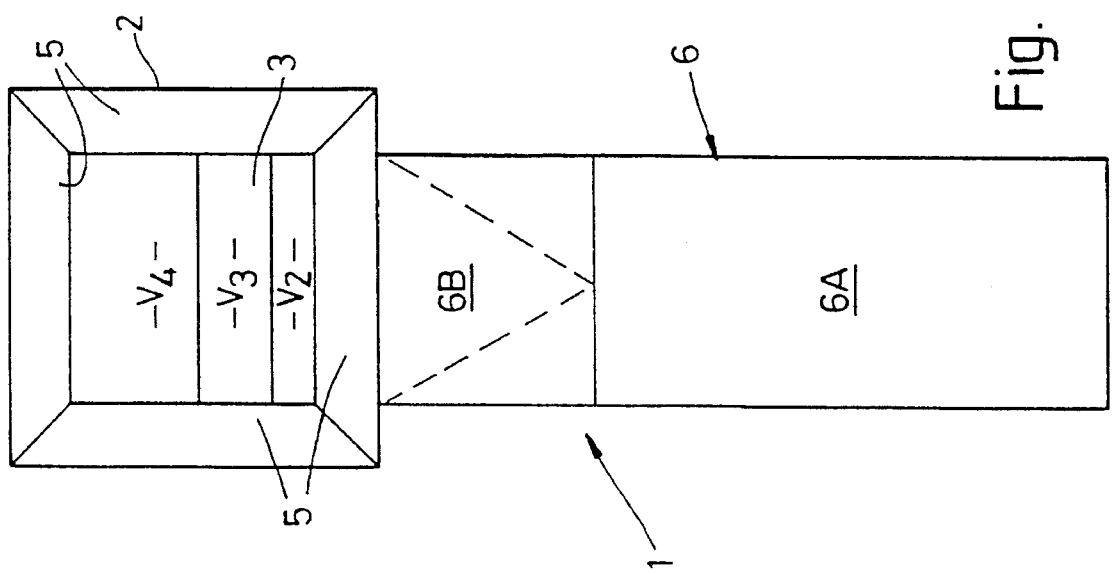

DEVICE FOR LIQUID AND SOLID DELIVERY FROM CROP SPRAYING AIRCRAFT

The present invention relates to a device for liquid and solid delivery from crop spraying aircraft.

A discharge device is known from U.S. application Ser. No. 1,722,467 for use in discharging treatment substance (e.g.. liquid) on to a crop or ground from a crop spraying aircraft, the device being adapted for mounting on an aircraft, said device comprising a conduit member providing an air passage, and supply means for supplying treatment substance to said air passage, said passage including an inlet portion to receive air due to forward movement of the aircraft, and an outlet portion for directing a downward discharge of said air together with said treatment substance. FR-A-183961 shows a further such discharge device: in this case, however, the supply means was strictly separate from the device, and required an air flow to carry the material into the air passage of the device. This is inefficient.

A particular problem of prior discharge devices for treatment material for use with aircraft, and especially present in the device of U.S. application Ser. No. 1,722,467, was that the placement of the treatment material discharged from the device could be very inaccurate. This problem arose from the way in which the air passage and discharge of the device were arranged in these prior devices. It is the principal object of the present invention to overcome the above problems.

The present invention provides for an improved method of directing and delivering fertilizer, herbicides, irrigation water and other toxic or nontoxic chemical sprays from an inflight aircraft crop spraying system such that the residual velocity of the liquid droplets, atomized and vapors and solids is sensibly downwards at high velocities on leaving the slipstream disturbance area of the spraying aircraft and does not have any significant horizontal component of velocity due to the aerodynamic turbulence of the propulsion system of the aircraft.

It is also a feature of this invention that the droplets and/or solid particles may be accelerated to subsonic, sonic or supersonic velocities using a minor portion of the energy of forward motion of the aircraft at normal flying speeds to this effect. Supersonic delivery velocity will be provided where the height of the flight path above the crops and the droplet size precludes leaf damage due to impact of the droplets, etc.

According to the present invention there is provided a discharge device for use in discharging treatment substance (e.g., liquid) onto a crop or ground from a crop spraying aircraft, the device being adapted for mounting on an aircraft, said device comprising a conduit member providing an air passage, and supply means for supplying treatment substance to said air passage, said passage including an inlet portion to receive air due to forward movement of the aircraft, and an outlet portion set at an angle relative to said inlet portion for directing a downward discharge of said air together with said treatment substance.

Essentially, the apparatus according to the invention is one or a number of such devices suspended from the wings or spray boom of an aircraft and preferably comprises a bell form inlet mouth leading to said inlet portion of the air passage, an elbow being present between the inlet and outlet portions. There is provided a smooth change of direction in the orifice device such that the included angle between the direction of the bell mouth and the exit lies normally between 90° and 45°. The bell mouth inlet will be sensibly aligned in the direction of the aircraft flight while the exit from the device will be usually, but not necessarily exclusively, downwards and inclined forward of the vertical by an angle variable according to the aircraft velocity and the droplet velocity such that the resultant absolute velocity of the droplets can be substantially vertically downwards.

The air passage can be of convergent/divergent form including a throat.

The design of the orifice convergence, throat and divergence follows normal practice for such orifices, when operating in air viz:— that the static pressure at the throat area will be approximately 53% of the developed inlet pressure at the bell mouth, which in one embodiment of the invention may be a parallel-sided or Kuchemann-type compression inlet, due to the ram effect of forward flow and the divergent portion will have an included angle of 10° to 12° for a length as determined whether the exit velocity of the droplets is required to be sonic, subsonic or supersonic to a required degree.

Liquid spray or solid material will be introduced to each orifice system by means of a pressurized feed to a nozzle normally located between the bell mouth of the orifice and the throat but may be external to the bell mouth and may eject spray material in any requested direction.

The distance from the liquid spray inlet to the outlet may be at least three times the inlet diameter of the nozzle for maximum spray droplet velocity leaving the nozzle.

Embodiment of the present invention will now be described by way of example with reference to the accompanying drawings in which:—

FIG. 2 shows a front elevation of the device;

Figure 1:
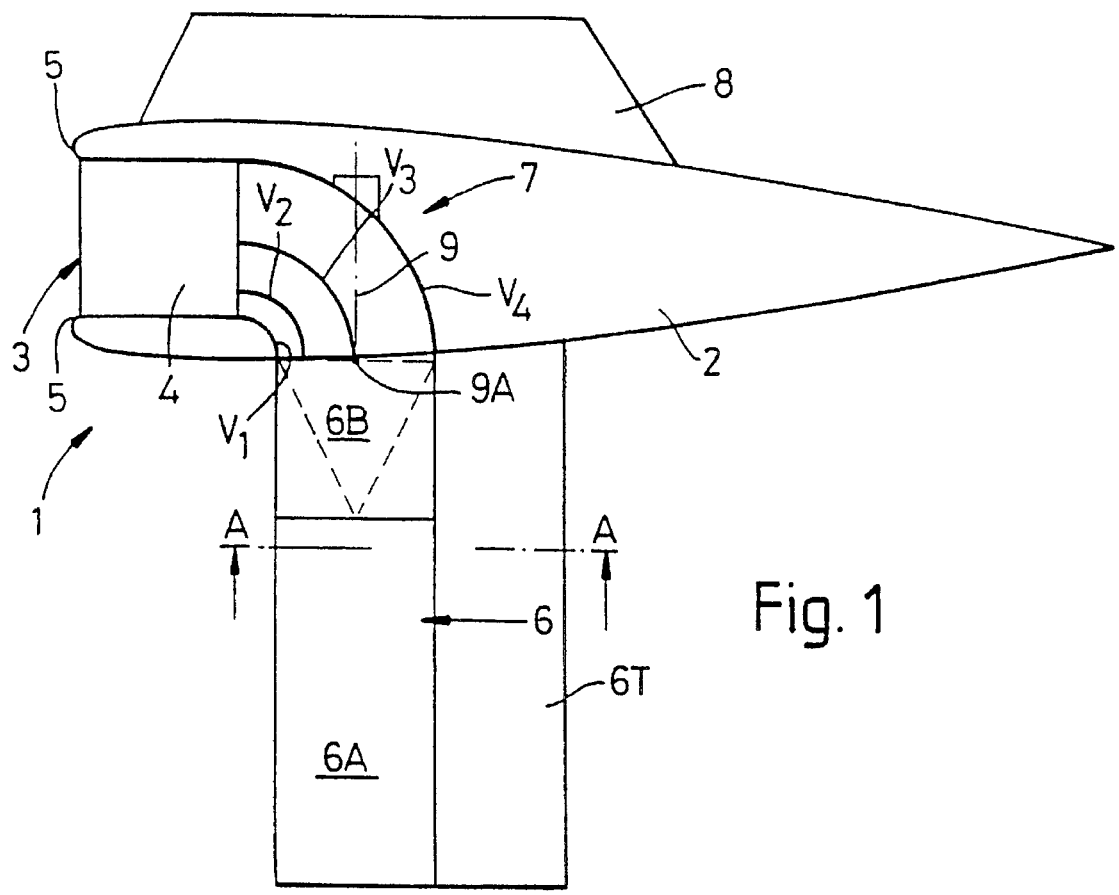
FIG. 1 shows a side elevation of a discharge orifice device, according to the present invention for use in spray discharge from crop spraying aircraft.
Figure 3:
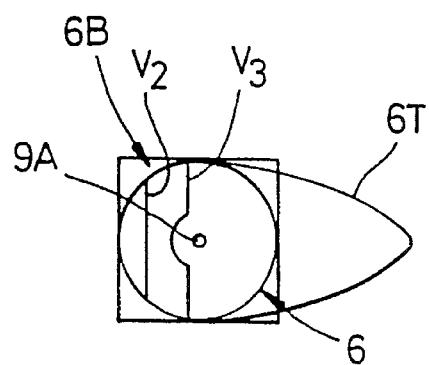
FIG. 3 shows a view on section A—A of FIG. 1.
Figure 4:
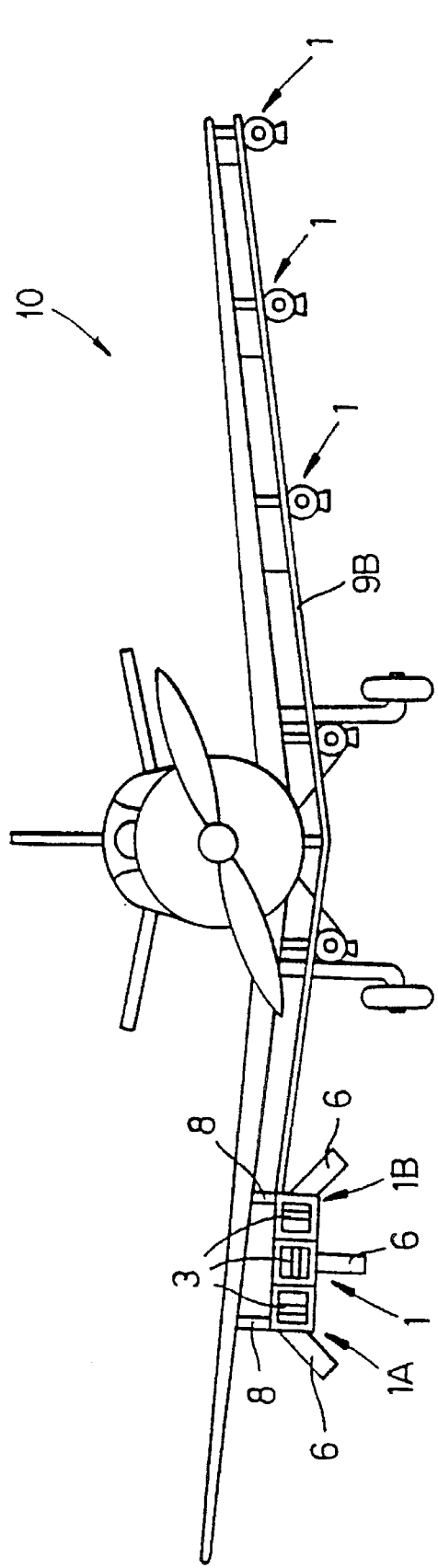

FIG. 4 shows a front view of a light aircraft fitted with a device generally as shown in FIGS. 1 to 3; and Referring to FIGS. 1 to 3, a discharge orifice device 1 is adapted for mounting below a wing of a crop spraying aircraft and serves for the discharge of spray treatment substances (liquid) downwards onto a crop or onto the ground prior to crop growing. The device 1 comprises a streamline form body 2 having an air inlet 3 of square cross-section leading to an inlet air passage 4 in the body 2, the body wall portion 5 at the inlet 3 being of curved bell mouth form.

An outlet pipe 6 extends laterally from the body 2 to provide a downwards-directed discharge flow from the device 1, and the pipe 6 communicates with the inlet air passage 4 via an elbow 7 in the body 2, the edges of which elbow 7 are defined by curved vanes $V_1$, $V_4$ of a vane set $V_1$ to $V_4$. Vanes $V_2$, $V_3$ of the set are located between the edge vanes $V_1$, $V_4$ to encourage a smooth airflow between the inlet passage 4 and the discharge pipe 6. The outer portion 6A of pipe 6 is of circular cross-section and a transition section 6B is arranged for transition of the square section of the inlet and elbow to the circular section of portion 6A. A support strut 8 is provided to facilitate mounting of the device 1 below an aircraft wing.

A supply conduit 9 for treatment substance (fluid) passes down through the body 2 at the elbow 7 and has a discharge nozzle 9A at the outlet end of the elbow 7 discharging downwardly into the pipe 6, so that the treatment fluid is caught up and carried by air passing through the air passage (4, 6, 7) in the device 1. The conduit 9 is connected to a suitable reservoir (not shown) of treatment substance (fluid), and a pressurized feed of the treatment fluid to the device 1 can be employed.

The air passage (4, 6, 7) of the device 1 is arranged to give optimum results and in this connection the pipe 6 will have an appropriate length. In particular, the pipe 6 (i.e., portions 6A/6B) can have a length such that the distance from the spray inlet at nozzle 9A to the outlet from the pipe 6 is preferably at least three times the inlet diameter of the orifice device for maximum spray droplet velocity leaving the orifice device 1. The pipe 6 can have a tail 6T.

The mounting of the device 1 on a crop spraying aircraft 10 is shown in FIG. 4, however, in FIG. 4 two additional similar devices 1A, 1B are included located side-by-side with the device 1, the devices 1A, 1B having sidewards and downwardly directed discharge pipes 6 instead of the directly downward pipe 6 of the device 1, all to give improved spray cover. In use of the device 1, when mounted on the aircraft 10, forward movement of the aircraft 10 in flight causes air to be drawn into the orifice device 1 via the inlet 3 and the air is accelerated in the device 1 to a high speed. Treatment liquid is discharged via nozzle 9A and is carried in the form of droplets by the air flow in the device so as to have a velocity substantially that of the air and the liquid droplets are discharged downwardly at speed from the outlet pipe 6.

The benefits accruing to an aircraft spraying system will arise as a result of the implementation of this invention from the increased accuracy of spray deposition, the reduction of the possibility of contamination of adjacent areas by chemical material and the reduction of spray drift which could have serious adverse environmental consequences.

The present invention can be used advantageously with the spray sensing or assessment operation described in the applicant's co-pending PCT Application.

I claim:

1. A discharge device for use in discharging a treatment substance onto a crop or a ground surface from a crop spraying aircraft, the device including means for mounting the device on an aircraft, a treatment substance supply means, a conduit member providing an air passage, said air passage including an inlet portion to receive air due to forward movement of the aircraft, an outlet portion with an outlet discharge and an elbow portion to connect the inlet portion to the outlet portion, said treatment supply means is located and arranged with respect to the air passage such that treatment substance is delivered substantially only in the outlet portion of the air passage, said outlet portion faces in downwardly direction to discharge said air and the treatment substance together in a direction having a major component vertically downward.

2. The device as claimed in claim 1, wherein the substance supply means includes a nozzle form outlet discharge.

3. The device as claimed in claim 2, wherein the nozzle form outlet discharge delivers treatment substance at a beginning of the outlet portion of the air passage substantially axially relative to said outlet portion.

4. The device as claimed in claim 2, wherein the outlet portion of the air passage has a length which is a multiple of a width of the air passage.

5. The device as claimed in claim 4, wherein a distance from the nozzle form outlet discharge to the outlet discharge of the outlet portion of the air passage is at least three times a cross-sectional width of the inlet portion of the air passage.

6. The device as claimed in claim 1, wherein the elbow portion is of rectangular cross-section, and arcuate guide vanes are present in the elbow portion for improved air flow through the elbow portion.

7. The device as claimed in claim 6, wherein the inlet portion is also of rectangular cross-section while at least a part of the outlet portion is of circular cross-section, a transitional portion is present for a smooth transition in shape between the rectangular cross-section elbow portion and the circular cross-section part of the outlet portion.

8. The device as claimed in claim 1, wherein the inlet portion has a bell mouth form inlet.

9. The device as claimed in claim 1, wherein the conduit member is of streamline form.

10. The device as claimed in claim 1, wherein the outlet portion comprises a pipe extending laterally relative to the inlet portion.

* * * * *

UNITED STATES PATENT AND TRADEMARK OFFICE
CERTIFICATE OF CORRECTION

PATENT NO. : 5,501,398
DATED : 26 March 1996
INVENTOR(S) : Maxwell W. DAVIDSON

It is certified that error appears in the above-indentified patent and that said Letters Patent is hereby corrected as shown below:

IN THE ABSTRACT, Line 5: Change "Outlet" to --outlet--.

| <u>Column</u> | <u>Line</u> | |
|---|---|---|
| 1 | 9 | Change "(e.g.. liquid)" to --(e.g., liquid)--. |
| 1 | 34 | Before "vapors" delete "and". |

Signed and Sealed this

Eighth Day of October, 1996

Attest:

BRUCE LEHMAN

Attesting Officer     Commissioner of Patents and Trademarks